C. E. BUSH.
Vehicle Wheel.
No. 196,873. Patented Nov. 6, 1877.
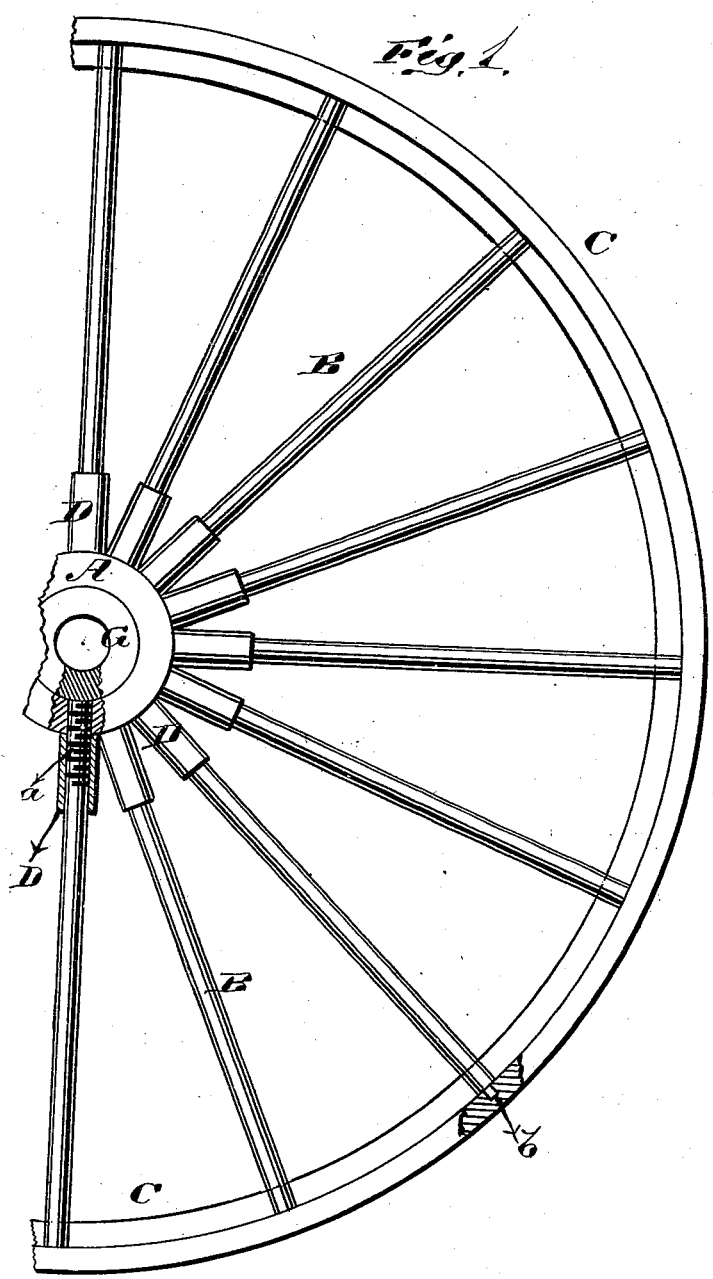
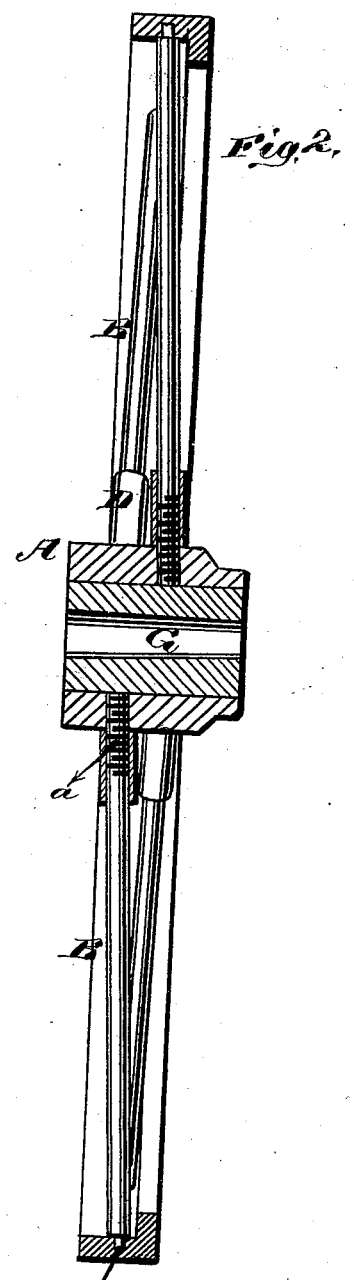

UNITED STATES PATENT OFFICE.

CHARLES E. BUSH, OF TECUMSEH, ASSIGNOR OF ONE-HALF HIS RIGHT TO ALFRED ROYER, OF CHEROKEE COUNTY, ALABAMA.

IMPROVEMENT IN VEHICLE-WHEELS.

Specification forming part of Letters Patent No. 196,873, dated November 6, 1877; application filed August 4, 1877.

*To all whom it may concern:*

Be it known that I, CHARLES E. BUSH, of Tecumseh, in the county of Cherokee and State of Alabama, have invented a new and valuable Improvement in Wagon-Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical sectional view of my wagon-wheel, and Fig. 2 is a transverse vertical sectional view thereof.

The nature of my invention consists in the construction and arrangement of a wagon-wheel, as will be hereinafter more fully set forth.

The annexed drawings, to which reference is made, fully illustrate my invention.

A represents the hub of my wheel, which hub is made of metal in one solid piece. B B are the spokes, and C is the felly.

The spokes B B are intended to be made tubular, and are at their outer ends formed with tenons $b$, while at their inner ends they are formed with exterior screw-threads $a$.

The spokes are screwed into the hub A in two alternate rows, as shown, standing at opposite angles, so as to all have their tenons $b$ enter the centers of the felly. On the inner end of each spoke B is placed a sleeve or elongated collar, D, which is threaded for about one-half its length on the inside, while the other or outer half is large enough to receive the full size of the spoke, thus, when the wheel is put together, forming a jam-nut, and a shoulder on the spoke against the hub, and also a sleeve surrounding the spoke and giving double strength at the hub.

The felly C is made of wrought-iron in one single piece, and it is made with an inwardly-projecting flange; or, in other words, the felly is L-shaped in its cross-section, which gives it great strength with comparatively small amount of metal, so as to be light, but at the same time strong and durable.

In putting the wheel together the sleeve D on each spoke is screwed outward thereon, and the spoke is then screwed into the hub far enough to let the felly pass over the tenons. The spokes are then backed out into the felly until they are perfectly solid; and then the combined jam-nut and sleeves are run down solid on the hub. When this is done the inner ends of the spokes are all through the hub, so that when the box G is afterward put in the hub the inner ends of the spokes will all rest solid on the box, and the combined felly and tire is tight on the tenons, so that it cannot possibly give way.

The wheel as thus constructed is strong and durable, and at the same time light, simple, and cheap.

What I claim as new, and desire to secure by Letters Patent, is—

The combination, with the felly and tire C, made in a single piece and L-shaped in cross-section, of the metal hub A, screw-threaded sleeves D, and the spokes B, screw-threaded at their inner ends, and provided at their outer ends with the tenons $b$, substantially as described, and for the purpose set forth.

In testimony that I claim the above I have hereunto subscribed my name in the presence of two witnesses.

CHARLES EDWARD BUSH.

Witnesses:
JOHN C. DOTY,
ALFRED ROYER.